(12) United States Patent
Pantow et al.

(10) Patent No.: US 7,669,416 B2
(45) Date of Patent: Mar. 2, 2010

(54) CIRCUIT FOR COOLING CHARGE AIR, AND METHOD FOR OPERATING SUCH A CIRCUIT

(75) Inventors: Eberhard Pantow, Möglingen (DE); Stefan Rogg, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 98 days.

(21) Appl. No.: 10/554,870

(22) PCT Filed: Apr. 29, 2004

(86) PCT No.: PCT/EP2004/004511

§ 371 (c)(1),
(2), (4) Date: Apr. 16, 2006

(87) PCT Pub. No.: WO2004/097194

PCT Pub. Date: Nov. 11, 2004

(65) Prior Publication Data
US 2006/0225417 A1    Oct. 12, 2006

(30) Foreign Application Priority Data
Apr. 30, 2003    (DE)    ................. 103 19 762

(51) Int. Cl.
- F02B 29/04    (2006.01)
- F02B 33/00    (2006.01)
- F01P 9/00    (2006.01)

(52) U.S. Cl. .................. 60/599; 123/563; 123/41.01
(58) Field of Classification Search .............. 60/599; 123/563, 41.01; 417/406
See application file for complete search history.

(56) References Cited

U.S. PATENT DOCUMENTS

| | | | | |
|---|---|---|---|---|
| 2,568,254 | A * | 9/1951 | Purcell | 91/48 |
| 3,134,371 | A | 5/1964 | Crooks | 123/563 |
| 3,141,293 | A | 7/1964 | Crooks | 60/599 |
| 3,229,456 | A * | 1/1966 | Gratzmuller | 123/563 |
| 3,752,132 | A * | 8/1973 | Bentz et al. | 123/563 |
| 3,829,238 | A | 8/1974 | Speck | 415/197 |
| 3,872,835 | A * | 3/1975 | Deutschmann | 123/563 |
| 4,237,689 | A * | 12/1980 | Sampietro | 60/599 |
| 5,269,143 | A | 12/1993 | Cikanek et al. | 60/599 |
| 5,353,597 | A | 10/1994 | Faulkner et al. | 60/599 |
| 5,415,147 | A * | 5/1995 | Nagle et al. | 123/563 |
| 5,427,508 | A * | 6/1995 | Kapich | 417/406 |
| 6,098,576 | A * | 8/2000 | Nowak et al. | 123/41.33 |
| 6,345,961 | B1 * | 2/2002 | Oklejas, Jr. | 417/365 |
| 6,647,934 | B2 * | 11/2003 | Marsh et al. | 123/563 |
| 6,848,397 | B2 * | 2/2005 | Haase | 123/41.01 |
| 2001/0045103 | A1 | 11/2001 | Khelifa | |
| 2003/0084900 | A1 * | 5/2003 | Leclerc et al. | 128/204.18 |

(Continued)

FOREIGN PATENT DOCUMENTS

DE    33 20 827 A1    12/1994

(Continued)

*Primary Examiner*—Thai Ba Trieu
(74) *Attorney, Agent, or Firm*—Foley & Lardner LLP (57) ABSTRACT

The invention relates to a circuit (NK) for cooling charge air (LL) in a motor vehicle comprising a turbocharger that is provided with a circulating pump (5) for the circuit (NK). Said pump (5) is coupled to a turbine (2) and forms a turbine/pump combination (1) along with the turbine (2).

9 Claims, 12 Drawing Sheets

U.S. PATENT DOCUMENTS

2005/0260088 A1* 11/2005 Kalavsky ............... 417/423.12

FOREIGN PATENT DOCUMENTS

| | | | |
|---|---|---|---|
| DE | 198 34 135 A1 | | 2/2000 |
| DE | 198 54 544 B4 | | 6/2000 |
| EP | 1 111 214 A2 | | 6/2001 |
| EP | 1 170 498 A1 | | 1/2002 |
| GB | 1 258 842 | * | 12/1971 |
| JP | 08158871 A | * | 6/1996 |

* cited by examiner

CIRCUIT FOR COOLING CHARGE AIR, AND METHOD FOR OPERATING SUCH A CIRCUIT

The invention relates to a circuit for cooling charge air in a motor vehicle with a turbocharger, and to a method for operating a circuit.

According to the prior art, turbochargers are used for compressing the air in order to increase the power of engines. In this case, however, a heating of the air, designated below as charge air, takes place at temperatures above 100° C. as a result of compression in the turbocharger. In order to reduce such air heating, air coolers are used which are arranged at the front in the cooling module and serve for cooling the charge air. The charge air in this case flows through a heat exchanger through which ambient air flows and which is consequently cooled. It is thereby possible to cool the charge air to a temperature which is about 15-50 K above the temperature of the ambient air.

Furthermore, it is known that the cooling of the charge air takes place via a coolant circuit, for example a low-temperature circuit, in which the coolant is cooled down to very low temperatures. By means of this cold coolant, the charge air is cooled down to a predetermined cooling temperature in a charge-air/coolant cooler. To connect the low-temperature circuit, there are two variants, to be precise an integration of the low-temperature circuit into a secondary circuit of the engine cooling system or a design in the form of a separate circuit.

The design as a separate circuit has the advantage that low temperatures can be achieved. There is a disadvantage that it requires a specific, conventionally electric coolant pump which entails additional costs. Furthermore, the useful life of the electric drive places limits on use in commercial vehicles.

Where the integrated circuit is concerned, if there is appropriate connection an additional pump may be dispensed with. However, the engine thermostat causes coupling to the temperature of the main circuit, so that, in the case of regulating thermostats, it is not possible to achieve the same cooling as with regard to a separate circuit. Moreover, in the case of outlet regulation, that is to say the thermostat is arranged at the engine outlet, the low-temperature circuit has to be mounted on the pump-pressure side. The pressure in the low-temperature cooler rises as a result, which may lead to problems regarding fatigue strength.

The object of the invention is to improve a circuit of the type initially mentioned; in particular, the advantages of both circuits according to the prior art are to be combined with one another.

According to the invention, a coolant-driven coolant pump is provided, which circulates the circuit for cooling charge air of a motor vehicle with a turbo-charger. In this case, in a second circuit, in particular a main circuit with a correspondingly designed pump (main coolant pump), which main circuit can be connected to the circuit, in the present case a low-temperature circuit, driven by the coolant-driven pump, so that coolant can flow from one circuit into the other, a turbine is driven by the coolant of the second circuit. In this case, the pump and the turbine form a turbine/pump combination.

The coolant part stream required for driving the turbine/pump combination may, for example, be branched off on the pump-pressure side of a main circuit and be returned again at the engine outlet. Alternatively, the coolant part stream may also be branched off at the engine outlet and be returned again on the pump-suction side. Other branch-off and return points are possible, for example extraction from coolant connections on the engine block, from the heating circuit or from ventilation lines. Return may take place at any desired points in the main coolant circuit, at which the pressure level is sufficiently low to make a sufficiently high pressure difference available between the extraction point and the return point.

Preferably, the pump and the turbine of the turbine/pump combination are rigidly connected to one another via a common shaft. Preferably, all the parts are plastic injection moldings, in particular the pump rotor and the turbine rotor being connected to one another via a shaft and being produced in one piece.

Since, as a rule, the same coolant is located on both sides of the turbine/pump combination, the leaktightness requirements one between the other are not so high and the outlay in sealing-off terms is therefore only low.

Preferably, a regulating valve for controlling the coolant quantity flowing through the turbine is arranged in the circuit of the turbine. The regulating valve is formed, in particular, by a throttle valve which may be arranged both upstream and downstream of the turbine. It may be formed, for example, by an electric actuating element, an expansion element or a pressure cell.

Activation of the regulating valve may take place, for example, as a function of the charge pressure, that is to say, in the case of a maximum charge pressure, maximum opening and therefore maximum throughflow are provided. This may take place, for example, directly by means of a pressure cell acted upon by the charge-air line. Thus, the throughflow in the low-temperature circuit is dependent, via the engine rotational speed which is proportional to the main water pump, and the charge pressure is dependent directly, on the heat quantity to be discharged in the charge-air cooler, this being near the thermodynamic optimum.

The regulating valve may also be activated as a function of temperature, for example the temperature of the coolant emerging from the charge-air/coolant cooler. The charge-air outlet temperature can thereby be kept largely constant. Moreover, an effective prevention of local coolant overheating is ensured. Temperature-managed control may take place, for example, via an expansion thermostat. A further possibility is to activate the regulating valve by means of a control apparatus which processes a plurality of measurement variables.

Preferably, the circuit in which the driving turbine is arranged and the circuit in which the pump driven by the turbine is arranged can be connected at least temporarily to one another. This may take place preferably by means of a four-way bypass valve or a mixing valve. By virtue of an appropriate design, the advantages of both systems can be combined with one another. What can thereby be achieved, in particular, is that, in operating states in which charge-air cooling has to be limited and/or for degassing the low-temperature circuit, the latter is integrated. In operating states in which maximum charge-air cooling is required, the low-temperature circuit is separated and is driven via the hydraulically driven pump.

Preferably, the four-way bypass valve has a bypass. The bypass reduces the flow resistance, since the flow path can, if required, be shortened.

Preferably, the four-way bypass valve is designed to be integrated directly in the turbine/pump combination, with the result that assembly is simplified.

For pressure compensation, preferably, the two circuits are connected to one another via a nonreturn valve.

The invention is explained in detail below by means of some exemplary embodiments, with reference to the drawing, in which.

Figure 1:
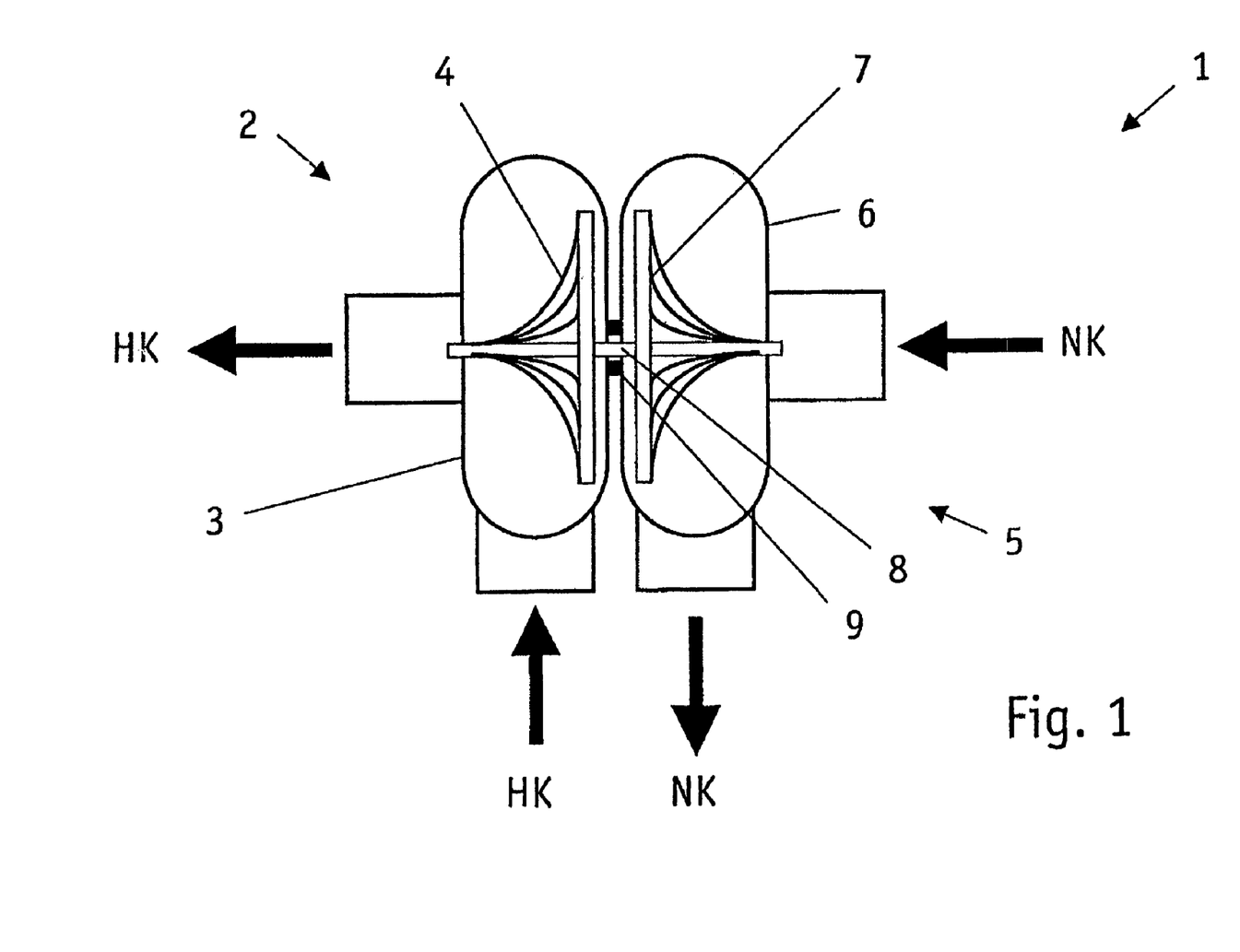
FIG. 1 shows an illustration of a turbine/pump combination.

FIG. 1 illustrates the basic construction of a turbine/pump combination 1, such as is used in the circuits illustrated in FIGS. 5 to 11. In this case, the turbine/pump combination 1 is formed by a turbine 2 with a turbine rotor 4 arranged in a turbine casing 3 and by a pump 5 with a pump rotor 7 arranged in a pump casing 6, said rotors being coupled fixedly in terms of rotation to one another via a shaft 8. In the present case, the turbine casing 3 and the pump casing 6 form a unit, a shaft seal 9 being provided on the shaft 8 which runs from the turbine side to the pump side. In the present case, the turbine 2 and the pump 5 are designed symmetrically with respect to one another, but other embodiments are also possible; in particular, the turbine and pump may be of different size and may have other forms of construction for the rotors.

Arrows in FIG. 1 indicate the flow directions of the two coolant streams flowing through the turbine/pump combination 1. In this case, a coolant part stream from the main coolant circuit flows on the turbine side through a turbine connection piece into the turbine 2, rotates the turbine rotor 4 and leaves the turbine 2 again through a turbine outlet connection piece. As a result of the rotationally fixed coupling via the shaft 8, the pump rotor 7 also rotates together with the turbine rotor 4, so that the pump 5 sucks in coolant from the low-temperature circuit through a pump intake connection piece, conveys this coolant and discharges it again through the pump outlet connection piece, with the result that the coolant is circulated in the low-temperature circuit. The arrangement of the various connection pieces does not necessarily have to correspond to the illustration of FIG. 1.

Figure 2A:
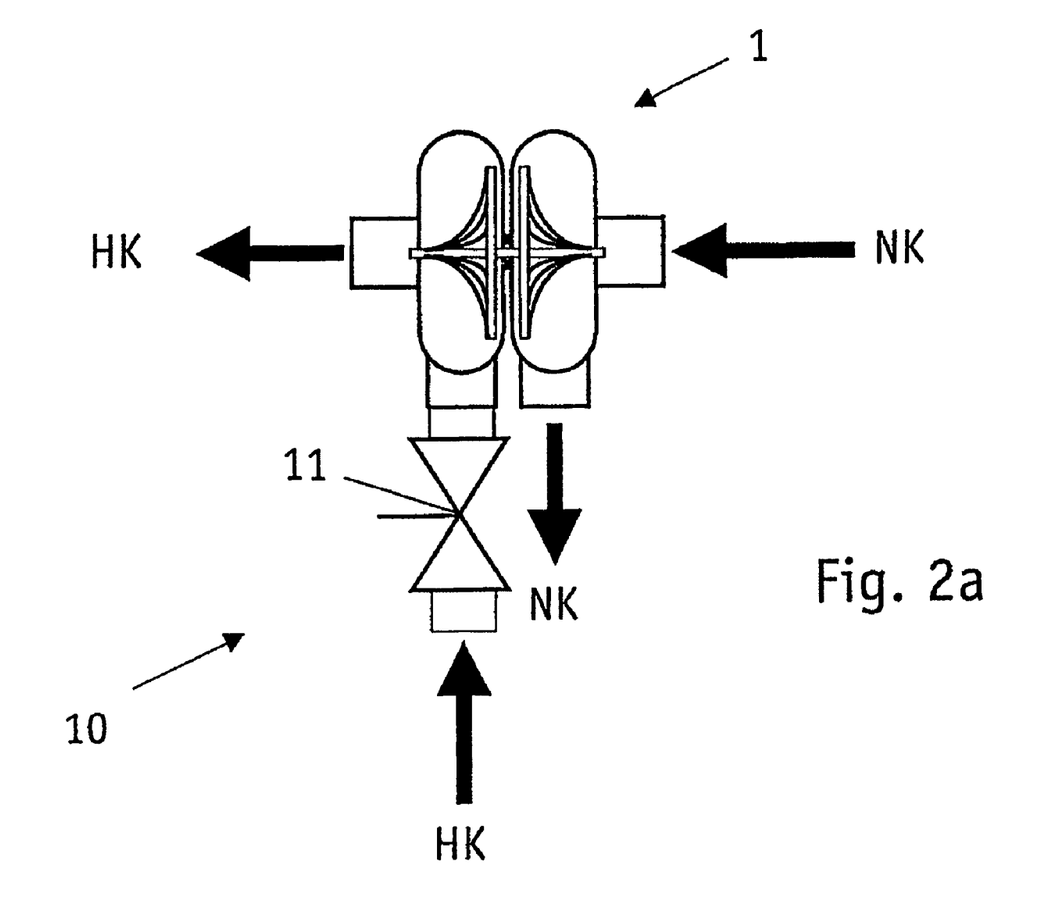
FIG. 2a, 2b show various possibilities for connecting the turbine/pump combination of FIG. 1, FIG. 3a, 3b show various connections of the turbine/pump combination in conjunction with a 4-way valve.

FIG. 2a shows the turbine/pump combination 1 of FIG. 1, there being arranged upstream of the turbine connection piece a throttle valve 11 which serves as a regulating valve 10 and which regulates the coolant quantity, flowing through the turbine 2, of the coolant part stream from the main coolant circuit and therefore also the rotational speed and the associated pump output of the pump 5. The throttle valve 11 may also be arranged, for example, downstream of the turbine outlet connection piece or at another point in the corresponding part of the main coolant circuit.

Figure 2B:
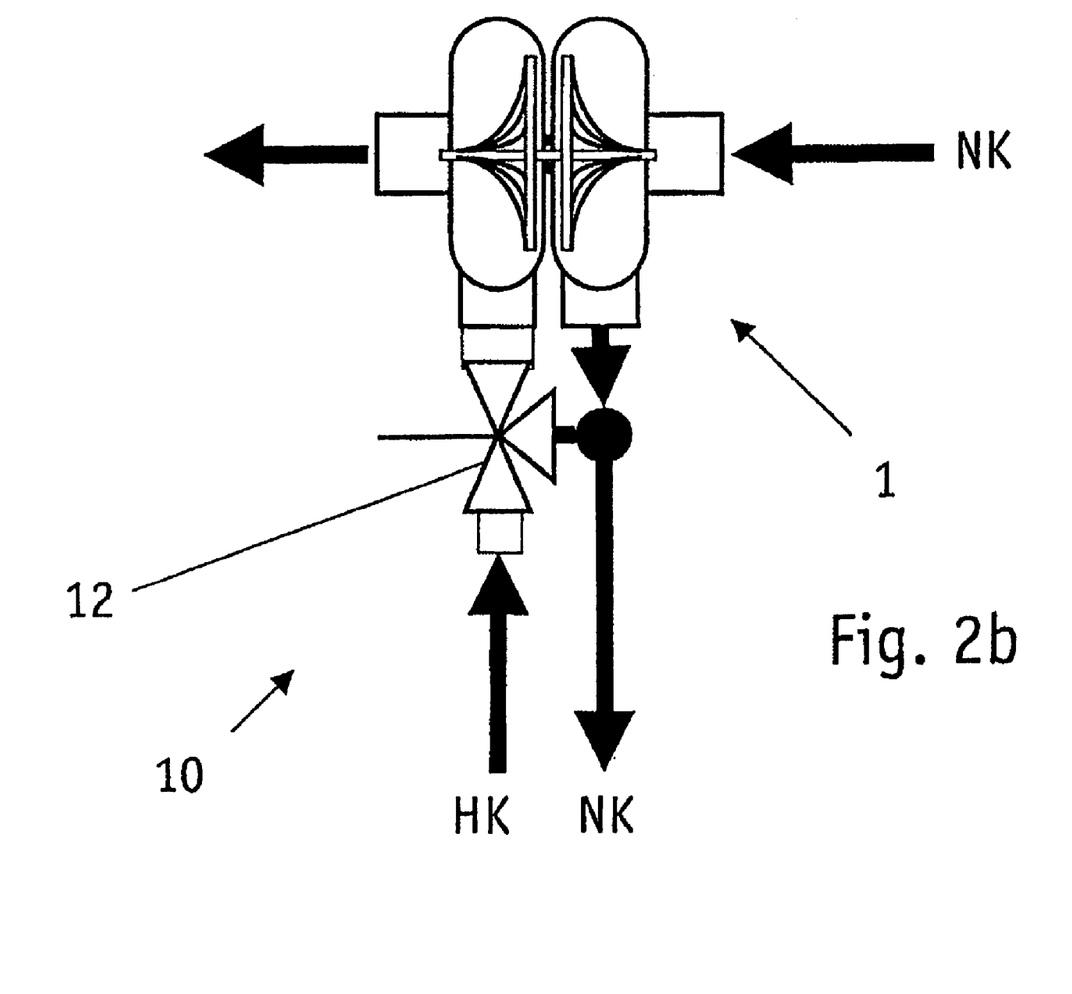

In FIG. 2b, a mixing valve 12 serving as a regulating valve 10 is arranged at the turbine connection piece, said mixing valve making a bypass available, so that part of the coolant from the main circuit is mixed with the coolant from the low-temperature circuit. In this case, the throughflow quantity through the turbine/pump combination 1 is successively reduced. Mixing may be used in order, for example in the event of a warm-up of the engine, to minimize the discharge of heat into the surroundings by the low-temperature cooler, or in order to regulate the cooling of the medium in the primary heat exchanger, that is to say, for example, the charge air in the charge-air/coolant cooler, to specific values.

Figure 3A:
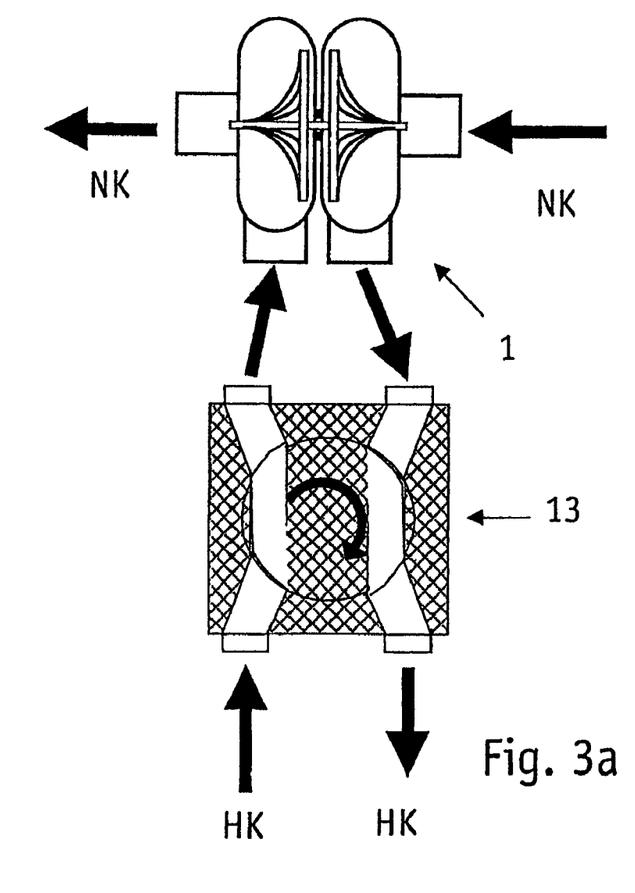
Figure 3B:
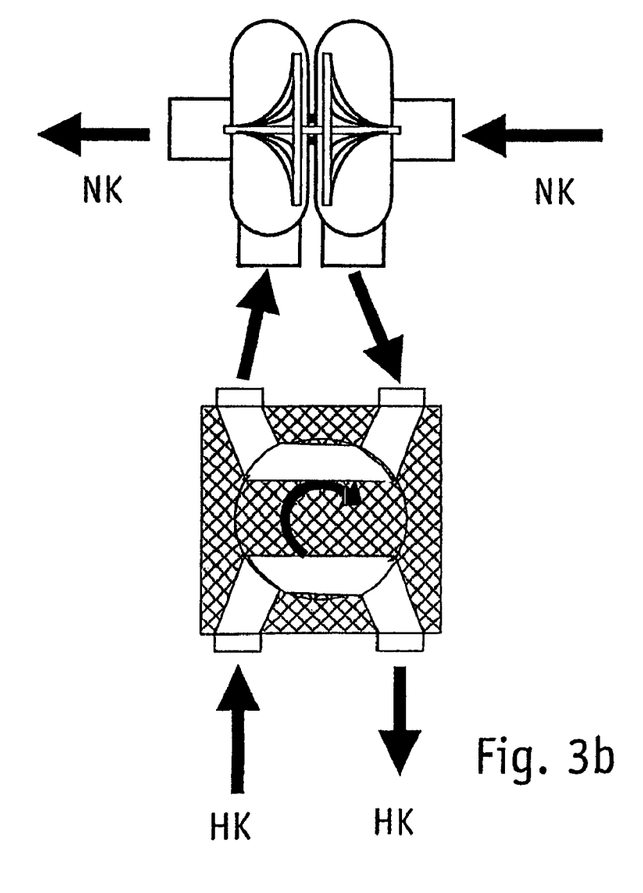
Figure 4A:
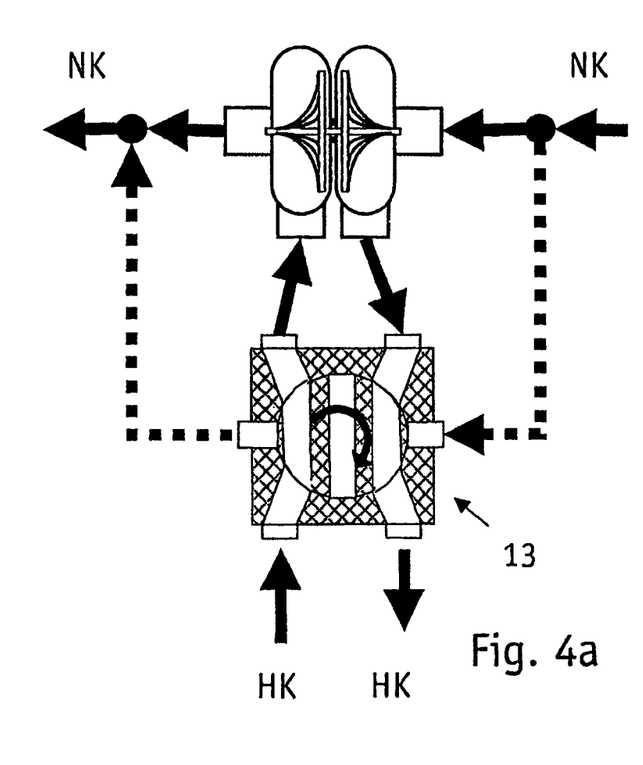
FIG. 4a, 4b show various connections of the turbine/pump combination in conjunction with an alternative 4-way valve.
Figure 4B:
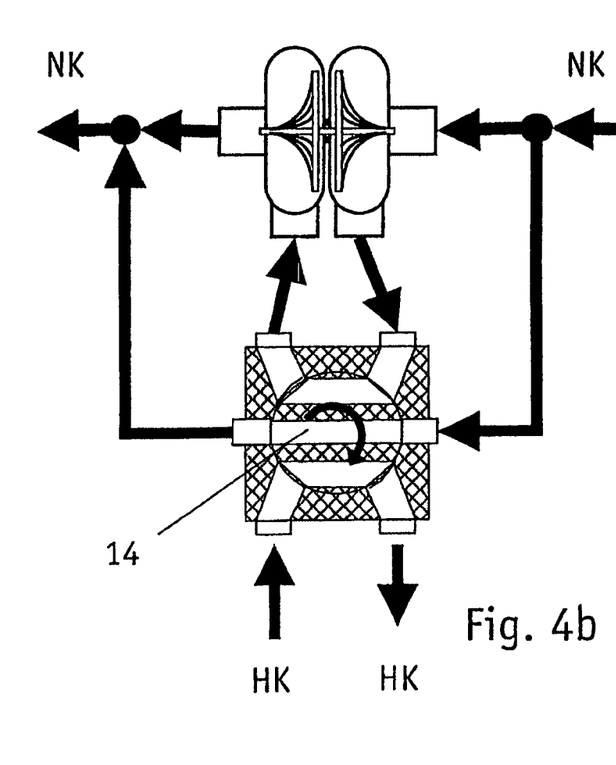

FIGS. 3a and 3b show diagrammatically the arrangement of a 4-way valve 12 which, as illustrated in FIG. 3b, allows a connection between the main circuit and the low-temperature circuit. In FIGS. 4a and 4b, a variant of a 4-way valve 12 with a bypass 13 for reducing the pressure loss in the event of an integrated low-temperature circuit is provided (cf. FIG. 4b).

Various circuits with a turbine/pump combination 1, as described above, are explained in more detail below with reference to FIGS. 5 to 11. In this case, identical components of the various exemplary embodiments are designated by the same reference symbols.

Figure 5:
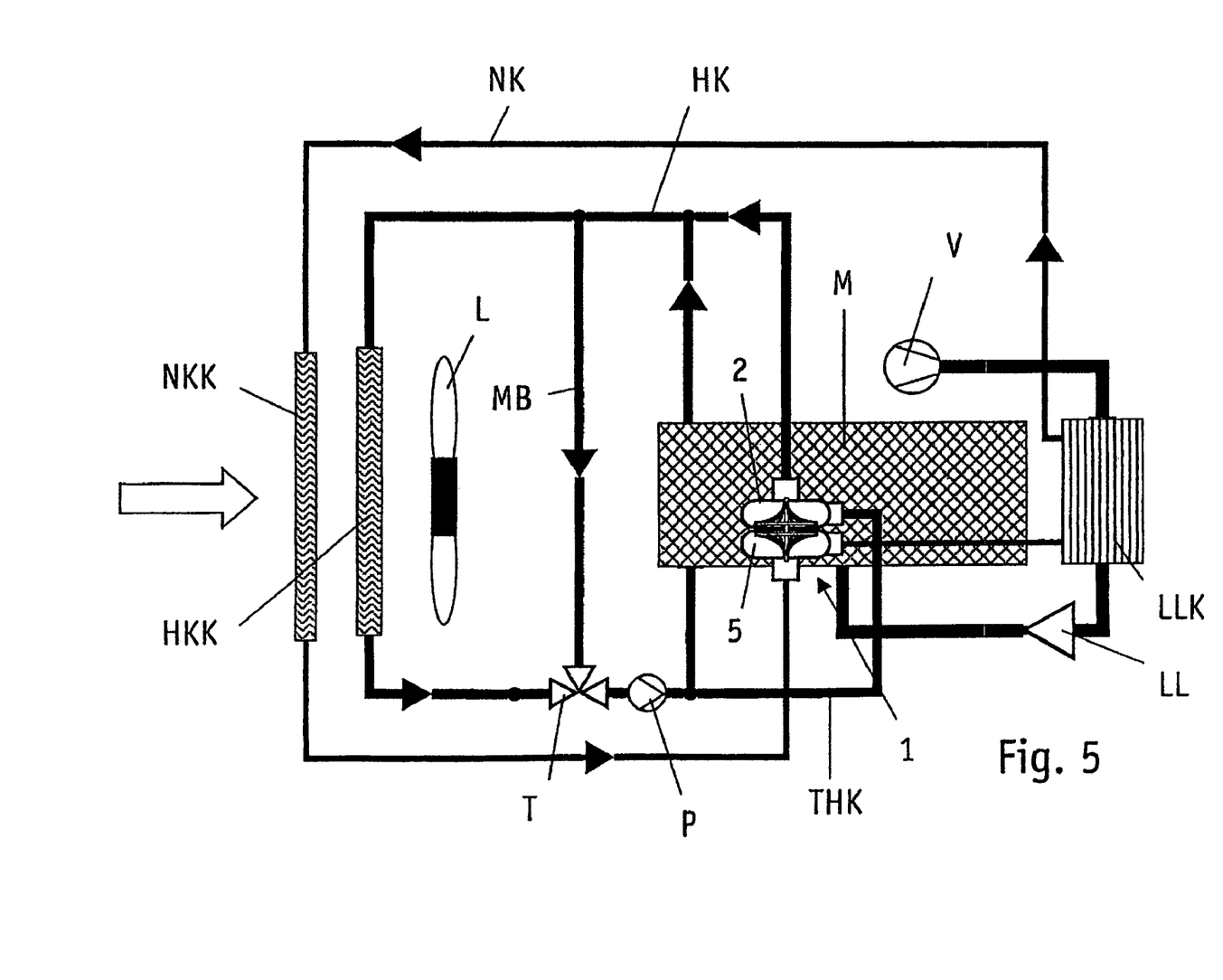
FIG. 5 shows a main coolant circuit and a low-temperature coolant circuit according to a first exemplary embodiment.

FIG. 5 shows a main circuit HK, in which the flow direction of the coolant flowing in the main circuit HK is indicated by arrows. The main circuit HK has a main coolant pump, designated below as the pump P, which circulates the coolant in the main circuit HK. Shortly downstream of the pump P, a subbranch THK branches off from the main circuit HK, the main circuit HK routing the coolant through the engine M, in order to cool the latter, and the subbranch THK leading to a turbine/pump combination 1 arranged in the region of the engine M, the coolant which flows in the subbranch THK flowing through the turbine/pump combination 1 on the turbine side and driving the latter, as described above. The subbranch THK is routed again to the main circuit HK subsequently, that is to say after the main circuit HK has flowed through the engine M.

The main circuit HK routes the hot coolant coming from the engine M to a main cooler HKK through which air (indicated by an arrow) flows. The air flow is assisted by a fan L. Furthermore, in the main circuit HK, an engine bypass MB is provided which is regulated by a thermostat T arranged upstream of the pump P (inlet regulation). The engine bypass MB runs parallel to the main cooler HKK. It is also possible to arrange the thermostat downstream of the engine outlet or upstream of the coolant inlet (outlet regulation).

Charge air LL coming from a compressor V is supplied to the engine M, the charge air LL passing through a charge-air/coolant cooler LLK and being cooled in the latter. The charge-air/coolant cooler LLK is part of a low-temperature circuit NK, the flow direction of the coolant flowing in the latter being indicated by arrows. The coolant flowing in this low-temperature circuit NK is circulated by the pump 5 of the turbine/pump combination 1, said pump being driven by the main circuit HK, as mentioned above. The low-temperature circuit NK leads to a low-temperature cooler NKK which is arranged parallel to the main cooler HKK and which is likewise cooled by the air flow generated by the fan L. The low-temperature cooler may also be arranged elsewhere, for example next to the main circuit or at a distance from the latter.

This very simple arrangement according to the first exemplary embodiment functions as follows: The coolant from the main circuit HK, circulated by the pump P, flows partially through the engine M, in order to cool the latter, and partially through the subbranch THK and therefore the turbine 2 of the turbine/pump combination 1, with the result that the turbine 2, and therefore also the pump 5, coupled to the latter via the shaft 8, of the turbine/pump combination 1, is driven by the coolant flowing in the main circuit HK. The further run of the main circuit HK has no particular features and is evident essentially from FIG. 5, and therefore it needs no further explanation. In the low-temperature circuit NK, the pump 5 driven by the turbine 2 continuously circulates the coolant located therein as a function of the conveying capacity of the pump P in the main circuit HK, no special control being provided in this case.

Figure 6:
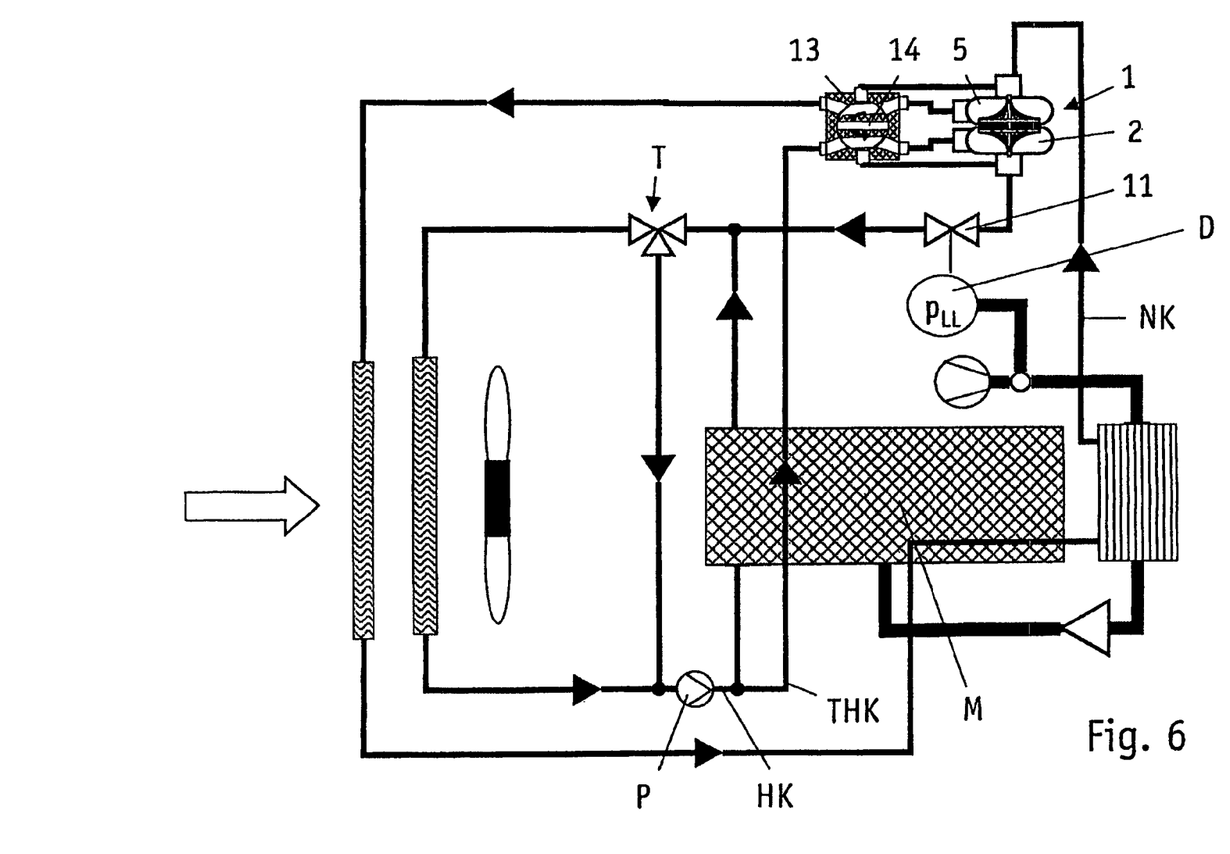
FIG. 6 shows a main coolant circuit and a low-temperature coolant circuit according to a second exemplary embodiment.

FIG. 6 shows a second exemplary embodiment, with the low-temperature circuit operating as a separate circuit, in which a 4-way valve 13 with a bypass 14 for reducing the pressure loss for full-load operation is arranged in the main and the low-temperature circuit HK and NK, said valve making it possible, as required, to integrate the low-temperature circuit NK into the main circuit HK. In this case, a regulatable throttle valve 11 is arranged in the subbranch THK, so as to follow the 4-way valve 13 and the turbine 2, and is controlled by a pressure cell D which causes coolant to flow through as a function of the charge-air pressure $p_{LL}$ (cf. FIG. 6). The further construction of the main circuit corresponds essentially to that of the previous exemplary embodiment, although the thermostat T is arranged at the other branch-off of the engine bypass MB (outlet regulation). Inlet regulation is likewise possible.

The coolant of the low-temperature circuit NK circulated by the pump 5 flows from the pump 5 through the 4-way valve 13 to the low-temperature cooler NKK, to the charge-air/ coolant cooler LLK and again to the pump 5.

When the 4-way valve 13 is rotated through 90°, the low-temperature circuit NK is integrated into the main circuit HK. Integration takes place particularly in operating states in which the charge-air cooling has to be limited. Furthermore, for this purpose, said integration may be used for exchanging the coolant of the low-temperature circuit NK and/or for degassing the low-temperature circuit NK. As may be gathered from FIG. 6, with the 4-way valve 13 rotated, coolant flows from the subbranch THK of the main circuit HK into the low-temperature circuit NK, whereas coolant from the low-temperature circuit NK flows both through the bypass 14 of the 4-way valve 13 and through the pump 5, the 4-way valve 13 and the turbine 2, past the regulatable throttle valve 11, into the main circuit HK.

Figure 7:
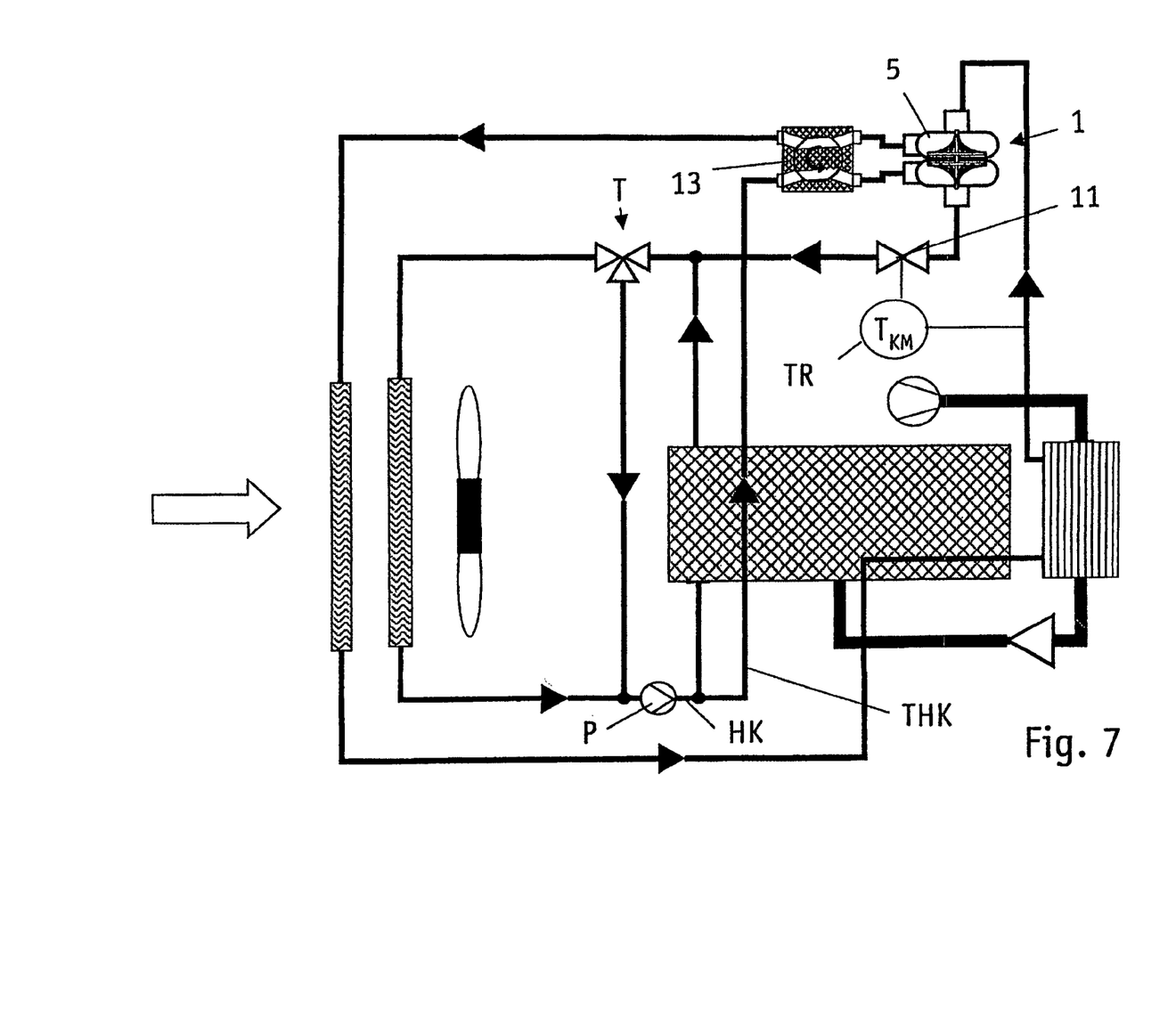
FIG. 7 shows a main coolant circuit and a low-temperature coolant circuit according to a third exemplary embodiment.

A third exemplary embodiment, illustrated in FIG. 7, corresponds essentially to the second exemplary embodiment of FIG. 6, except that, instead of the pressure cell D which controls the throttle valve 11, a temperature regulator TR is provided, which controls the throttle valve 11 as a function of the coolant temperature $T_{KM}$. Furthermore, no bypass 14 is provided in the 4-way valve 13, so that the entire coolant has to flow through the pump 5 and the turbine 2.

The activation of the throttle valve may also take place by means of a control apparatus which determines and sets the coolant stream in the low-temperature circuit which is required in the respective operating state of the engine.

Figure 8:
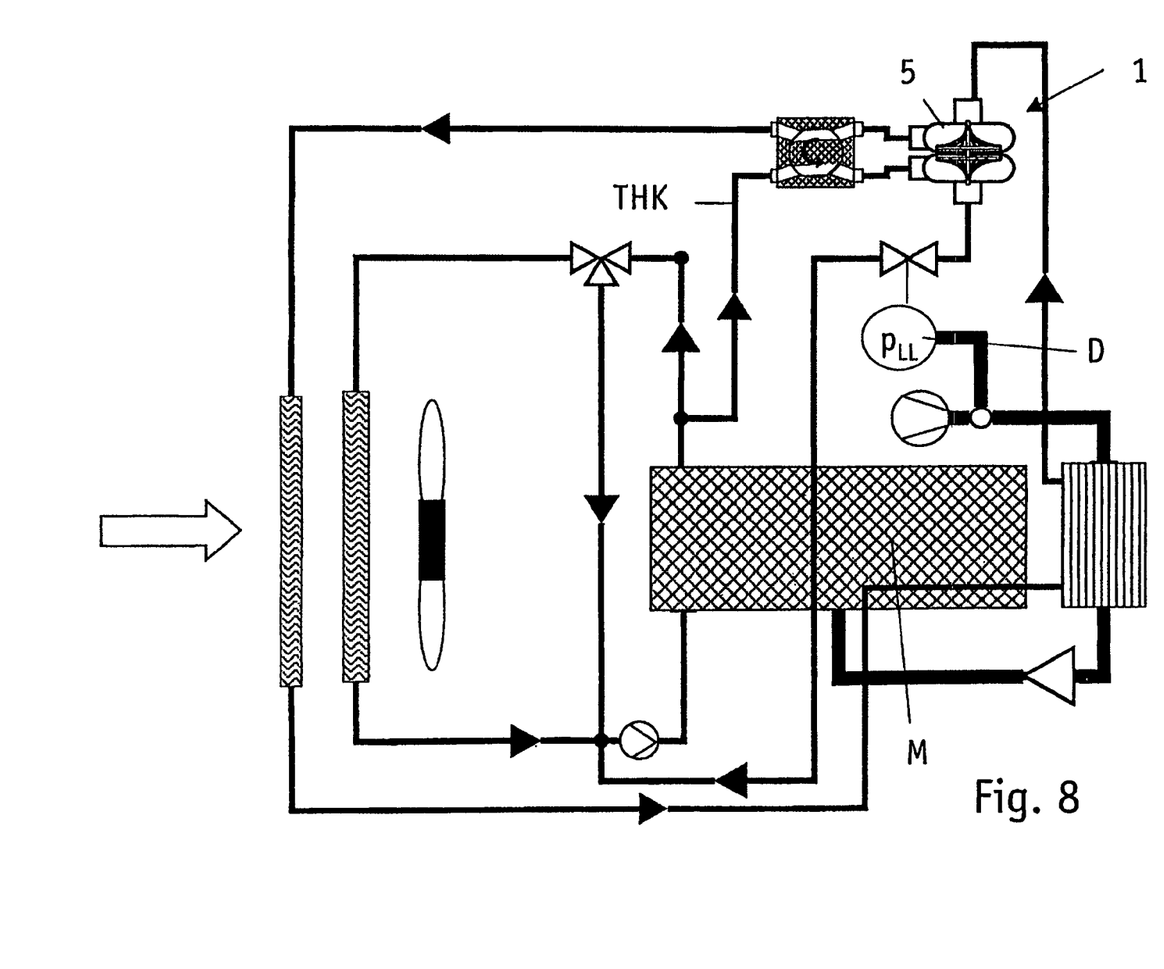
FIG. 8 shows a main coolant circuit and a low-temperature coolant circuit according to a fourth exemplary embodiment.

FIG. 8 shows a fourth exemplary embodiment, in which the branch-off of the subbranch THK in the main circuit HK is arranged only downstream of the flow through the engine M. In this case, the return takes place shortly upstream of the pump P, so that there is a sufficient pressure difference. The construction otherwise corresponds essentially to that of the second exemplary embodiment, and, correspondingly to the third exemplary embodiment, no bypass 14 is provided in the 4-way valve 13.

Figure 9:
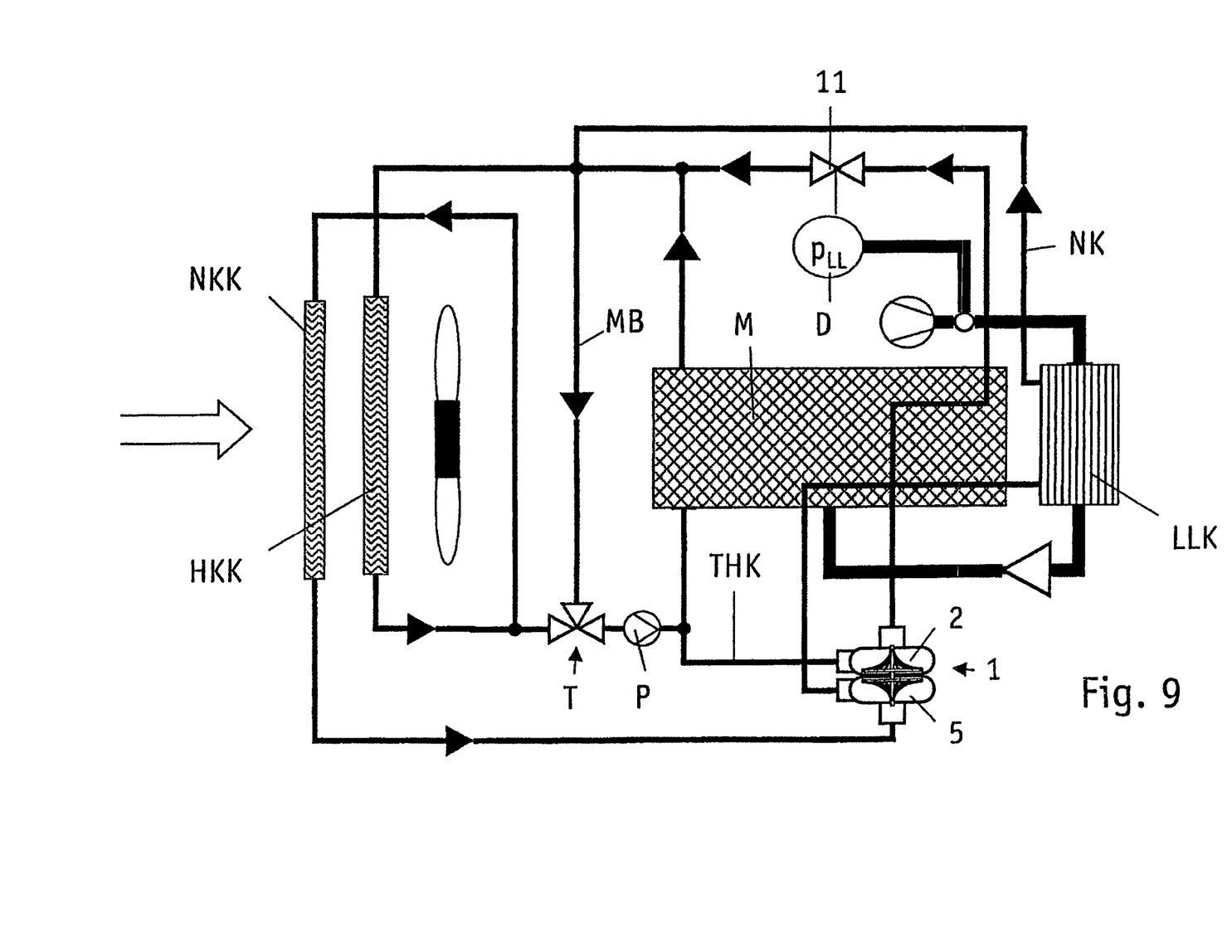
FIG. 9 shows a main coolant circuit and a low-temperature coolant circuit according to a fifth exemplary embodiment.

In a fifth exemplary embodiment, illustrated in FIG. 9, the coolant for the low-temperature circuit NK is branched off directly downstream of the main cooler HKK, shortly upstream of the thermostat T and the pump P. The branched-off coolant, which has already run through the main cooler HKK, is conducted through the low-temperature cooler NKK and subsequently through the turbine 2 of the turbine/pump combination 1, from where the cold coolant is conducted through the charge-air/coolant cooler LLK, to cool the charge air, and through the engine bypass MB further on to the thermostat T or, depending on the control by the latter, to the main cooler HKK.

Coolant which flows through the subbranch THK passes from the main circuit HK through the pump 5 of the turbine/ pump combination 1 which in this case serves as an additional drive. The coolant subsequently flows through the throttle valve 11, which is controlled as a function of the charge-air pressure $p_{LL}$, and is subsequently routed to the main circuit HK again. When the throttle valve 11 is closed, no coolant passes through the turbine 2 and brakes the pump 5 to "idling", so that less coolant is also conducted through the low-temperature circuit NK.

Figure 10:
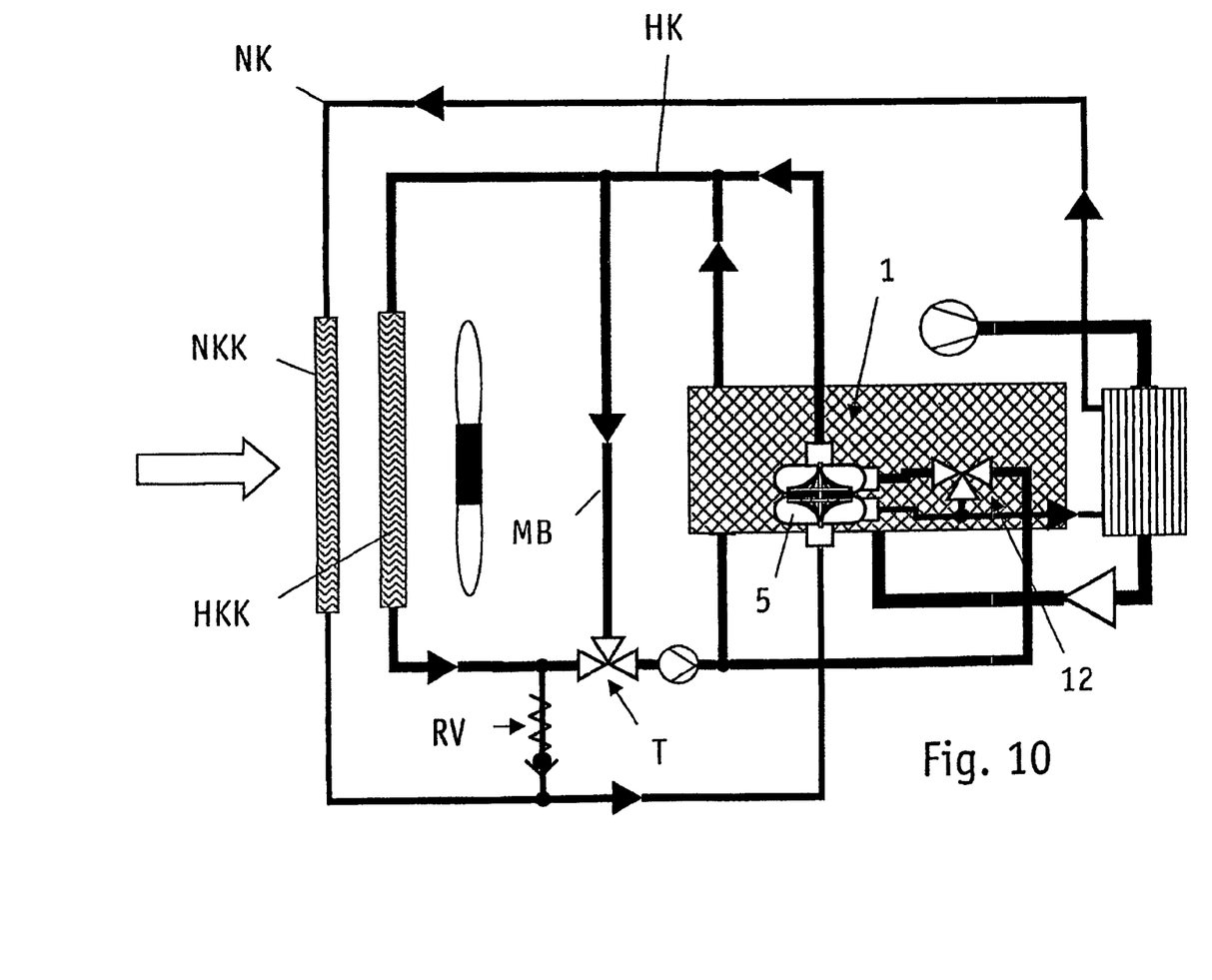
FIG. 10 shows a main coolant circuit and a low-temperature coolant circuit according to a sixth exemplary embodiment.

According to a sixth exemplary embodiment, illustrated in FIG. 10, which is similar to the first exemplary embodiment illustrated in FIG. 5, a mixing valve 12, as illustrated in FIG. 2b, is provided, which connects the two circuits HK and NK to one another and which is used for controlling the inflow temperature into the charge-air/coolant cooler LLK and therefore for controlling the temperature of the charge air. The low-temperature cooler NKK can thereby be bypassed under appropriate operating conditions. For pressure equalization between the two circuits HK and NK, a nonreturn valve RV is provided between these in a part of the main circuit HK in which the pressure is relatively low.

Figure 11:
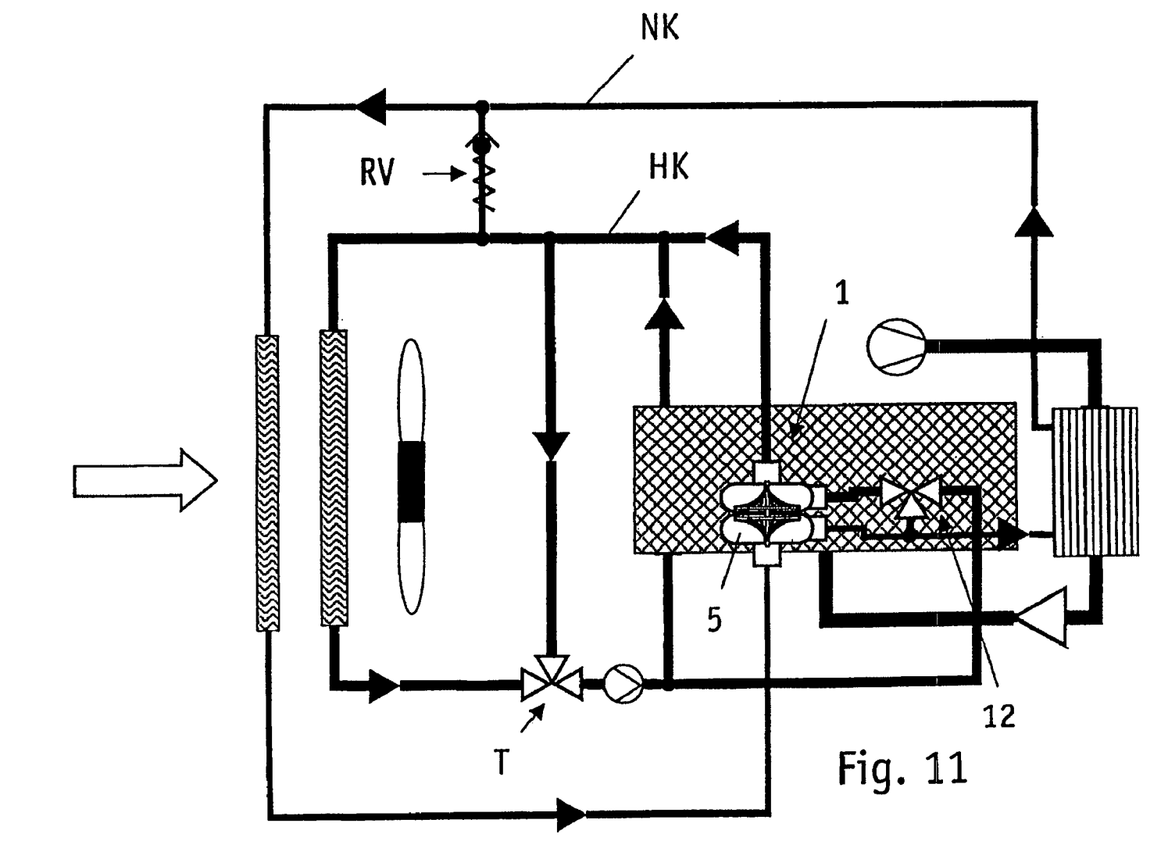
FIG. 11 shows a main coolant circuit and a low-temperature coolant circuit according to a seventh exemplary embodiment.

A seventh exemplary embodiment, illustrated in FIG. 11, corresponds essentially to the sixth exemplary embodiment illustrated in FIG. 10, although the non-return valve RV, which is provided between the main circuit HK and the low-temperature circuit NK, is not arranged downstream of the coolers HKK and NKK, but, instead, downstream of the engine bypass MB and upstream of the coolers HKK and NKK.

List of Reference Symbols

1 Turbine/pump combination
2 Turbine
3 Turbine casing
4 Turbine rotor
5 Pump
6 Pump casing
7 Pump rotor
8 Shaft
9 Shaft seal
10 Regulating valve
11 Throttle valve
12 Mixing valve
13 4-way valve
14 Bypass
D Pressure cell
HK Main circuit HK
HKK Main cooler
L Fan
LL Charge air
LLK Charge-air/coolant cooler
M Engine
MB Engine bypass
NK Low-temperature circuit
NKK Low-temperature cooler
P Pump
$p_{LL}$ Charge-air pressure
RV Nonreturn valve T Thermostat
THK Subbranch
$T_{KM}$ Coolant temperature
TR Temperature regulator
V Compressor

The invention claimed is:

1. A method for cooling charge air by a circuit which is circulated by a pump circulating a first circuit, comprising:
   driving the pump directly or indirectly by a turbine integrated into a second circuit, the pump and the turbine forming a turbine/pump combination, wherein the first circuit and the second circuit are in fluid communication with each other via a valve,
   determining a requirement of a charge air cooling operating state, and
   operating the valve to temporarily fluidly separate the first circuit and the second circuit so as to not be in fluid communication with each other when maximum charge air cooling is determined to be required for the charge air cooling operating state.

2. The method as claimed in claim 1, wherein regulation of the turbine/pump combination takes place by a regulating valve which is arranged in the second circuit of the turbine.

3. The method as claimed in 2, wherein the regulating valve is controlled as a function of the requirement of the charge air cooling operating state which comprises coolant temperature and/or of charge-air pressure and/or via a signal from a control apparatus which determines engine load and which determines coolant requirement in the first circuit from the engine load.

4. A circuit for cooling charge air in a motor vehicle, comprising:
   an integrated circuit comprising a first circuit and a second circuit, a turbocharger, a pump circulating the first circuit, a turbine integrated into the second circuit, and a valve; and
   a control apparatus,
   wherein the pump is physically coupled to the turbine to form a turbine/pump combination,
   wherein the control apparatus is configured to determine when a maximum charge air cooling is required after processing a plurality of measurement variables;
   wherein the valve is configured to be operated by the control apparatus such that the first circuit and the second circuit are in fluid communication with each other via the valve but are temporarily fluidly separated by the valve so as to not be in fluid communication with each other when the control apparatus determines that the maximum charge air cooling is required and operates the valve,
   wherein the second circuit is a main coolant circuit,
   wherein the valve is a four-way bypass valve for allowing fluid connection and fluid disconnection between the first and second circuits, and
   wherein the four-way bypass valve has a bypass.

5. The circuit as claimed in claim 1, wherein the pump and the turbine have a common shaft.

6. The circuit as claimed in claim 1, wherein the pump comprises a pump rotor and a pump casing, and the turbine comprises a turbine rotor and a turbine casing, and
   wherein the pump rotor, pump casing, turbine rotor, and turbine casing are made by plastic injection molding.

7. The circuit as claimed in claim 1, further comprising a regulating valve for controlling a coolant quantity flowing through the turbine, wherein the regulating valve is arranged in the second circuit.

8. The circuit as claimed in claim 1, wherein the four-way bypass valve is designed to be integrated in the turbine/pump combination.

9. The circuit as claimed in claim 1, wherein the first circuit and the second circuit are in fluid communication with each other via the valve in a state where charge-air cooling needs to be limited, in a state where the low-temperature circuit is being degassed, or a combination thereof.

* * * * *